(12) United States Patent
Olney

(10) Patent No.: US 7,204,429 B2
(45) Date of Patent: Apr. 17, 2007

(54) CONTROLLER FOR FORCED-AIR HVAC SYSTEM

(75) Inventor: Andrew Olney, Morrisville, NY (US)

(73) Assignee: Intelligent Power Management, Inc, Utica, NY (US)

( * ) Notice: Subject to any disclaimer, the term of this patent is extended or adjusted under 35 U.S.C. 154(b) by 308 days.

(21) Appl. No.: 10/834,307

(22) Filed: Apr. 28, 2004

(65) Prior Publication Data
US 2005/0241325 A1 Nov. 3, 2005

(51) Int. Cl.
B60H 1/32 (2006.01)
F25D 17/00 (2006.01)

(52) U.S. Cl. .................... 236/49.3; 62/178

(58) Field of Classification Search ............ 62/178, 62/180, 186, 157, 231; 236/49.3, 11, DIG. 9, 236/78 D, 91 F; 165/247; 318/439, 471, 318/806
See application file for complete search history.

(56) References Cited
U.S. PATENT DOCUMENTS

| 4,659,290 | A | 4/1987 | Kundert |
| 4,722,669 | A | 2/1988 | Kundert |
| 4,734,012 | A | 3/1988 | Dob et al. |
| 5,197,667 | A | 3/1993 | Bowsky et al. |
| 5,364,026 | A | 11/1994 | Kundert |
| 6,070,660 | A | 6/2000 | Byrnes et al. |
| 6,617,815 | B1 | 9/2003 | Krief |
| 6,684,944 | B1 * | 2/2004 | Byrnes et al. ............... 165/247 |
| 6,695,046 | B1 * | 2/2004 | Byrnes et al. ............... 165/247 |
| 2001/0028239 | A1 | 10/2001 | Vanderhenst |
| 2001/0042792 | A1 | 11/2001 | Kline et al. |

FOREIGN PATENT DOCUMENTS

DE  3803119 A1 *  8/1989

* cited by examiner

*Primary Examiner*—Chen Wen Jiang

(57) ABSTRACT

A forced-air HVAC system has an induction motor that drives its fan or blower. The motor is controlled by a circuit that causes the speed of the fan or blower to vary continuously whenever the HVAC system operates. The controller circuit includes temperature sensors that continuously monitor the temperature of the air the system is delivering. These sensors signal the controller circuit to vary the speed of the fan or blower motor in order to maintain at an optimal level the air temperature in the spaces heated or cooled by the system.

21 Claims, 5 Drawing Sheets

CONTROLLER FOR FORCED-AIR HVAC SYSTEM

BACKGROUND OF THE INVENTION

This invention relates to controlling the flow of air in a forced-air HVAC system. In particular, this invention offers a means to monitor the system temperature and, in response thereto, to vary continuously the speed of the fan or blower whenever the system operates.

Present forced-air HVAC systems control the speed of a fan or blower motor, generally an induction motor, in one of three ways: (1) the fan runs at full speed, (2) the fan speed is stepped, or (3) the fan cycles on and off when the system operates. In these systems, the flow of forced air is discontinuous. It does not start until well after the system has called for the flow of heated or cooled air. Thus premises with more than one room that are served by a single HVAC system can develop hot and cold air pockets throughout the occupied space. Therefore, for optimal comfort, there is need for a continuous flow of air, circulating at varying velocities, to mix air above and below the thermostatically set level and eliminate pockets at non-optimal temperatures, thereby bringing to a substantially single optimal temperature the entire space to be heated or cooled. Depending on the season, both heating and cooling may be required during a single period to keep the space at the substantially single optimal temperature set by at least one thermostat.

Most forced-air HVAC systems use the air temperature of only one occupied space to cycle the fan or blower on and off. Other systems use the difference between the respective air temperatures in a plenum and in a return to turn the fan or blower on and off, e.g., U.S. Pat. No. 6,684,944 to Byrnes et al. These systems cause a delay in supplying air at an optimal temperature. Still other systems open and close dampers to control temperature in the space to be heated or cooled. In none of these systems of the prior art does the blower/fan motor operate continuously. Thus, to obtain an optimal temperature, there is a need to monitor continuously the heating plenum and/or cooling coil and to adjust accordingly the blower/fan motor speed continuously to overcome the drawbacks of the prior art and keep the space at a substantially single and stable optimal temperature.

OBJECTS AND SUMMARY OF THE INVENTION

An object of the present invention is to provide a system of forced-air HVAC system control that overcomes the drawbacks of the prior art by operating the blower/fan motor continuously.

A further object of the present invention is to vary the velocity of a continuous air flow in a forced-air HVAC system, because a system that uses HEPA or UV filtering requires a constant flow of air to maximize filtration.

Yet another object of the present invention is to vary the velocity of a continuous air flow in a forced-air HVAC system and thus maintain a substantially stable optimal temperature in the space served by the system.

Still a further object of the present invention is to ensure that, in the event the return air and plenum temperatures are equal, but are either higher or lower than an optimal room temperature, the speed of the fan or blower motor will continue to increase or decrease, thereby allowing the air in the ducts and in the occupied space to mix until a substantially single, stable optimal temperature is established throughout the entire system.

Briefly stated, the present invention provides a forced-air HVAC system with an induction motor that drives its fan or blower. The motor is controlled by a circuit that causes the speed of the fan or blower to vary continuously whenever the HVAC system operates. The controller circuit includes temperature sensors that continuously monitor the temperature of the air the system is delivering. These sensors signal the controller circuit to vary the speed of the fan or blower motor in order to maintain at a substantially single, stable optimal level the air temperature in the spaces heated or cooled by the system.

According to an embodiment of the invention, a method of controlling a blower/fan motor in a forced-air HVAC system to maintain a substantially optimal temperature in an interior comprises the steps of: measuring a temperature in the interior space; communicating the substantially optimal temperature to a controller; when the substantially optimal temperature is higher than the temperature in the interior space, causing the controller to call for heated air from the system; when the substantially optimal temperature is lower than the temperature in the interior space, causing the controller to call for cooled air from the system; varying continuously a speed of the blower/fan motor in response to the call for the heated or the cooled air, whereby the blower/fan motor runs substantially continuously once it starts; the step of varying being responsive to a temperature sensed in a plenum chamber of the system when the call is for the heated air; and the step of varying being responsive to a temperature sensed in a cooling coil of the system when the call is for the cooled air.

According to a feature of the invention, apparatus for controlling a blower/fan motor in a forced-air HVAC system to maintain a substantially optimal temperature in an interior space comprises: means for measuring a temperature in the interior space; means for communicating the substantially optimal temperature to a controller; when the substantially optimal temperature is higher than the temperature in the interior space, the controller being effective to call for heated air from the system; when the substantially optimal temperature is lower than the temperature in the interior space, the controller being effective to call for cooled air from the system; the controller being effective to vary continuously a speed of the blower/fan motor in response to the call for the heated or the cooled air, whereby the blower/fan motor runs substantially continuously once it starts; the controller being further effective to vary the speed of the blower/fan motor in response to a temperature sensed in a plenum chamber of the system when the call is for the heated air; and the controller being further effective to vary the speed of the blower/fan motor in response to a temperature sensed in a cooling coil of the system when the call is for the cooled air.

According to another feature of the invention, apparatus for controlling a blower/fan motor in a forced-air HVAC system to maintain a substantially optimal temperature in an interior space comprises: a controller effective for varying continuously a speed of the blower/fan motor, whereby the blower/fan motor runs substantially continuously once it starts; the controller being responsive to at least one of a plenum temperature and a cooling coil temperature; and the controller being further responsive to a temperature sensor in the interior space, whereby the interior space is kept at a temperature substantially optimal and stable.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 2 graphs the response of a forced-air HVAC system controlled by the present invention when only heating is called for.

FIG. 3 graphs the response of a forced-air HVAC system controlled by the present invention when only cooling is called for.

FIG. 4 graphs the response of a forced-air HVAC system controlled by the present invention when both heating and cooling are called for.

DETAILED DESCRIPTION OF THE PREFERRED EMBODIMENT

Figure 1:
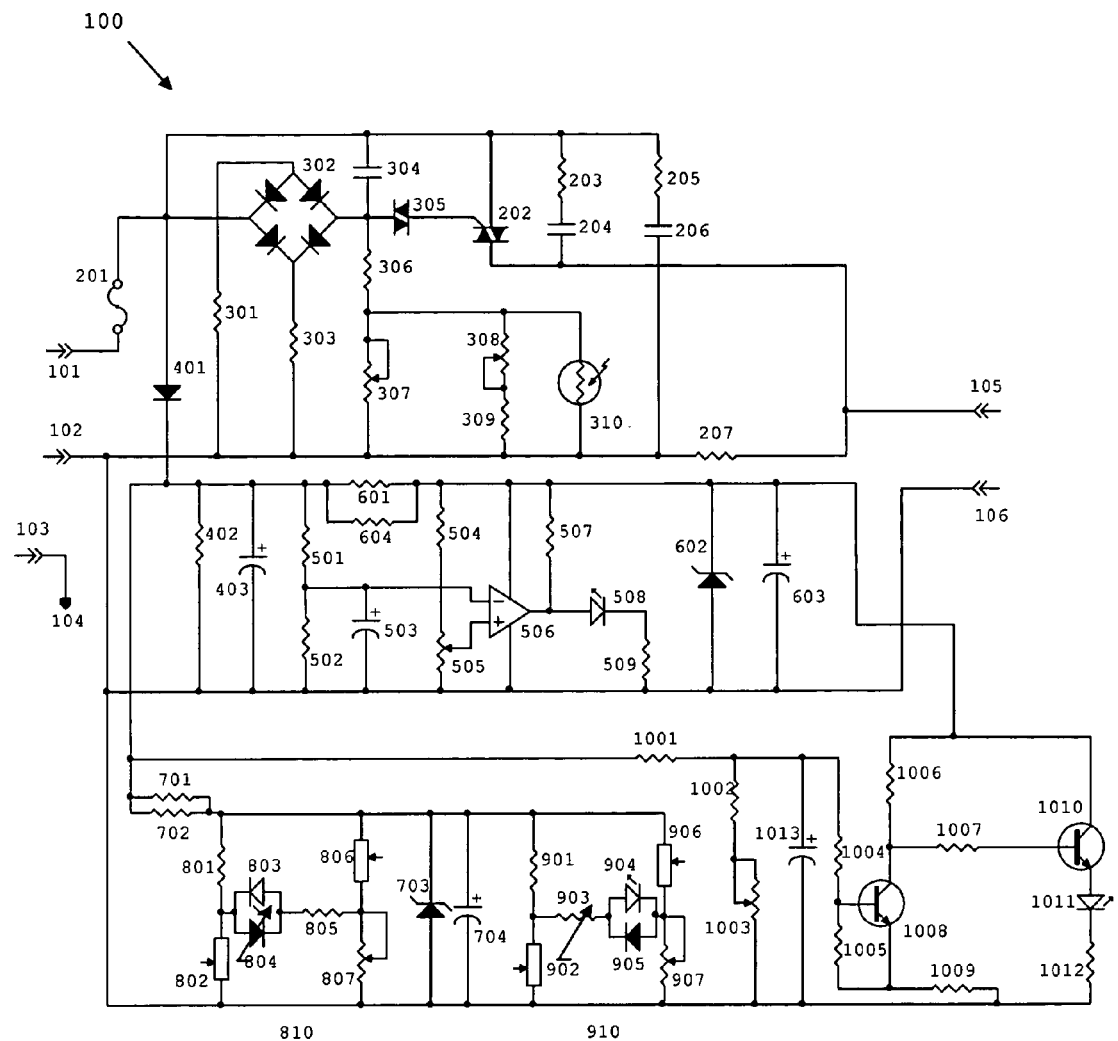
FIG. 1 is a diagram of the controller circuit of the present invention.

Referring to FIG. 1, 120V AC enters a circuit 100 of the present invention at a point 101 and returns through a point 102 kept at neutral. Circuit 100 is connected to a ground 104 through a point 103. A motor is connected through points 105 and 106 to be controlled by circuit 100.

The AC that enters circuit 100 passes through a fuse 201 and enters a voltage conditioning circuit formed by resistors 203 and 205 and capacitors 204 and 206 that snub out transient voltages. An AC load resistor 207 stabilizes circuit 100's output. An alternistor 202 provides a gated line voltage.

Control of this gated line voltage is provided by a combination of resistors 301, 303, 306, 307, 308, 309, and 310 together with a bridge 302, a capacitor 304, and a diode 305.

A diode 401 and a capacitor 403 provide a peak high-voltage DC supply for feeding both electrical energy and reference voltage to the circuit. A resistor 402 is connected across capacitor 403 to detect a brownout.

An optically-controlled mathematical processor (MPD), configured to accept multiple inputs and furnish a single output, comprises four LEDs 508, 803, 904, and 1011 for inputs and resistor 310 for output of the gated line voltage.

A network comprising resistor 501 and capacitor 503 provides a time-constant voltage to a comparator 506, which compares it to a reference voltage provided by resistors 504 and 505. At power-up, this network provides, via a pull-up resistor 507, a signal that elevates the output RMS voltage to the load. A resistor 502 bleeds voltage from the time-constant voltage network when the system is de-energized. A resistor 509 limits the current input to the MPD.

A diode 602 and a capacitor 603 provide a low-voltage, regulated DC supply, which is stepped down by resistors 601 and 604. A pair of resistors 701 and 702, a diode 703, and a capacitor 704 provide a regulated DC voltage for sensing temperature.

To sense the heating temperature, a network of resistors 801, 802, 806, and 807 comprises a resistive bridge 810. Resistors 802, 806 are thermistors that do the actual sensing of the heating temperature. Resistive bridge 810 provides an input signal to the MPD, which in turn sends a control signal to the gate control circuit. A resistor 805 limits the current entering the MPD. A diode 804 provides a reverse clamping voltage to protect the MPD.

To sense the cooling temperature, a network of resistors 901, 902, 906, and 907 comprises a resistive bridge 910. Resistors 902, 906 are thermistors that do the actual sensing of the cooling temperature. Resistive bridge 910 provides another input signal to the MPD, which in turn sends a control signal to the gate control circuit. A resistor 903 limits the current entering the MPD. A diode 905 provides a reverse clamping voltage to protect the MPD.

To sense a fault in the system, especially a brownout, a network, comprised of resistors 1001, 1002, 1003, 1004, 1005, 1006, 1007, and 1009, capacitor 1013, and transistors 1008 and 1010, sends an inversely proportional signal as an input to the MPD, which in turn sends a control signal to the gate control circuit. A resistor 1012 limits the current entering the MPD.

Figure 2:
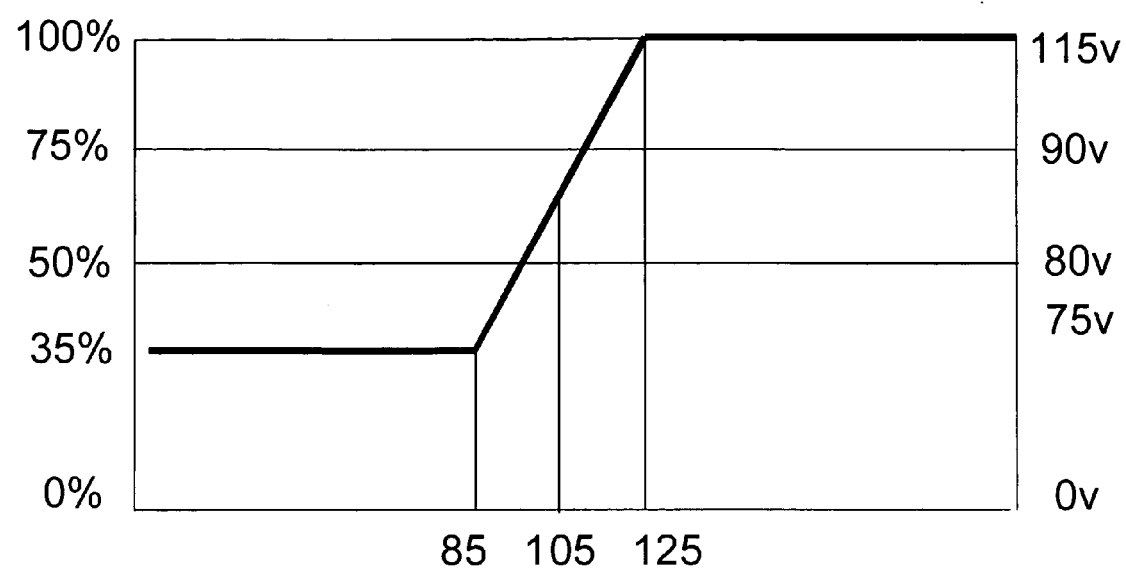

FIG. 2 graphs the performance of a forced-air HVAC system controlled by the present invention when the system calls for heating only. The horizontal axis is temperature in degrees Fahrenheit. The right-hand vertical axis is the true RMS voltage delivered to the blower/fan motor. The left-hand vertical axis is the percentage of maximum blower/fan motor speed.

Referring to FIG. 2, plenum air temperature is plotted against airflow and blower/fan motor speed when the controller of the present invention is set for heating only. The graph shows an increasing airflow with increasing temperature sensed within the plenum airflow and decreasing flow with decreasing temperature sensed within the plenum airflow, as called for by the controller of the present invention. The graph also shows that, when the sensed temperature is normal room temperature, the blower/fan motor runs at its minimum speed. Similarly, when the sensed temperature is at 125 degrees F. or higher, the blower/fan motor runs at its maximum speed until the plenum air equilibrates approximately with the desired temperature, at which point the blower/fan motor returns to minimum speed.

Figure 3:
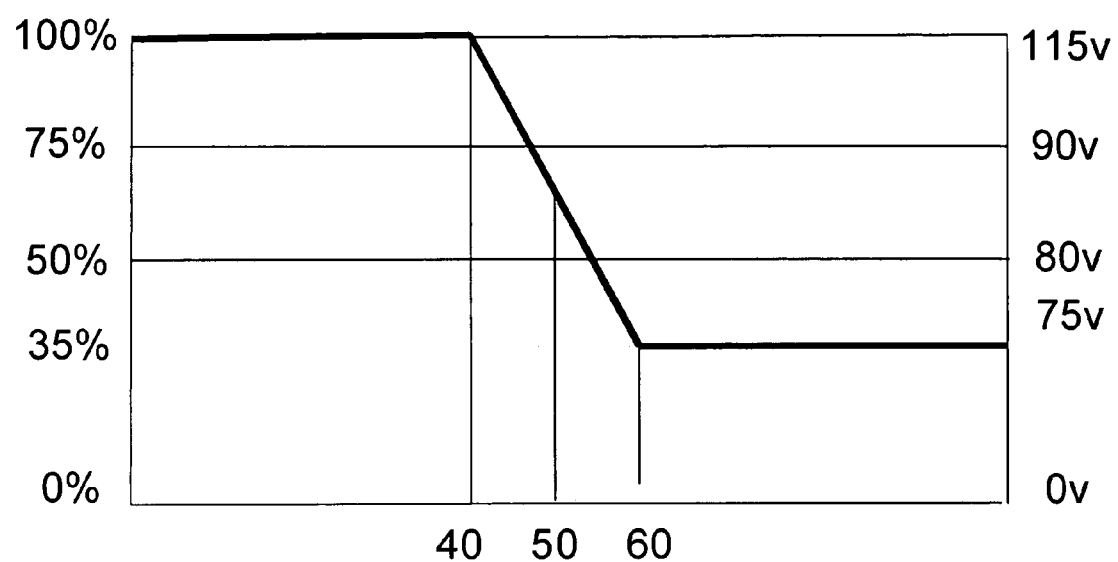

FIG. 3 graphs the performance of a forced-air HVAC system when the controller of the present invention calls for cooling only. The horizontal axis is temperature in degrees Fahrenheit. The right-hand vertical axis is true RMS voltage delivered to the blower/fan motor. The left-hand vertical axis is the percentage of maximum blower/fan motor speed.

Referring to FIG. 3, cooling-coil temperature is plotted against airflow and blower/fan motor speed when the controller of the present invention is set for cooling only. The graph shows an increasing change in airflow with decreasing temperature sensed on the cooling coil and decreasing flow with increasing temperature sensed on the cooling coil, as called for by the controller of the present invention. The graph also shows that, when the sensed temperature is at normal room temperature, the blower/fan motor runs at its minimum speed. Similarly, when the sensed temperature is at 40 degrees F. or lower, the blower/fan motor remains at its maximum speed until the cooling coil equilibrates approximately with the desired temperature, at which point the blower/fan motor returns to minimum speed.

Figure 4:
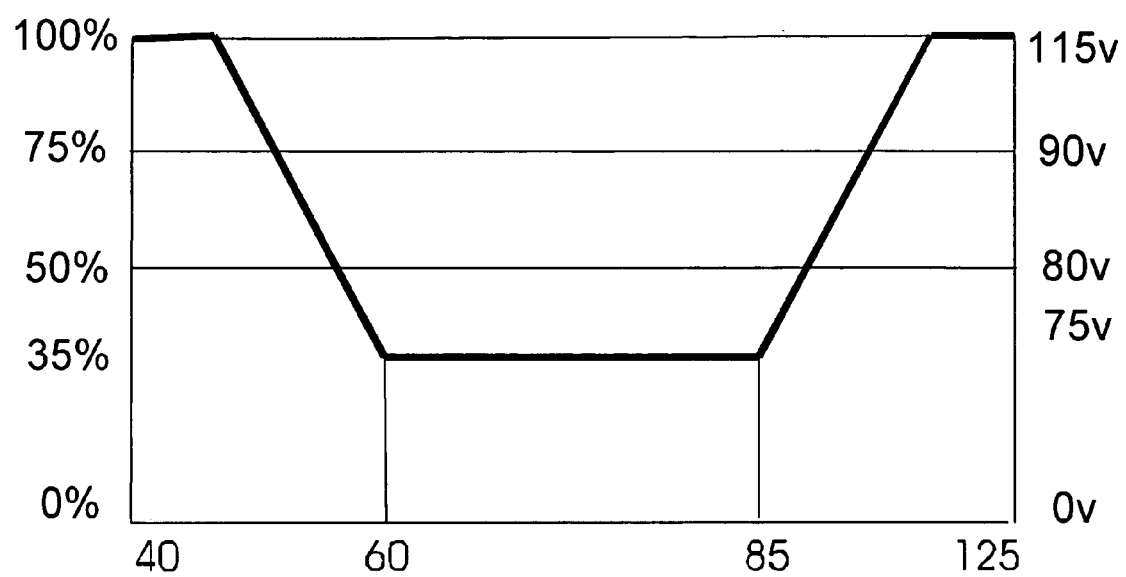

FIG. 4 graphs the performance of a forced-air HVAC system when the controller of the present invention calls for both heating and cooling. The horizontal axis is temperature in degrees Fahrenheit. The right-hand vertical axis is true RMS voltage delivered to the blower/fan motor. The left-hand vertical axis is the percentage of maximum blower/fan motor speed.

Referring to FIG. 4, the composite plenum air/cooling coil temperature is plotted against airflow and blower/fan motor speed of a controller of the present invention that calls for both heating and cooling. The graph shows the changes in airflow with increasing and decreasing temperature sensed within/on the plenum airflow and cooling coil, as called for by the controller of the present invention. The graph also shows that, when the sensed temperature is at normal room temperature the blower/fan motor remains at its minimum speed. Similarly, when the sensed temperature is at either 125 degrees F. or higher or 40 degrees F. or lower, the blower/fan motor remains at its maximum speed until the plenum air or cooling coil equilibrates approximately with the desired temperature, at which point the blower/fan motor returns to minimum speed.

Figure 5:
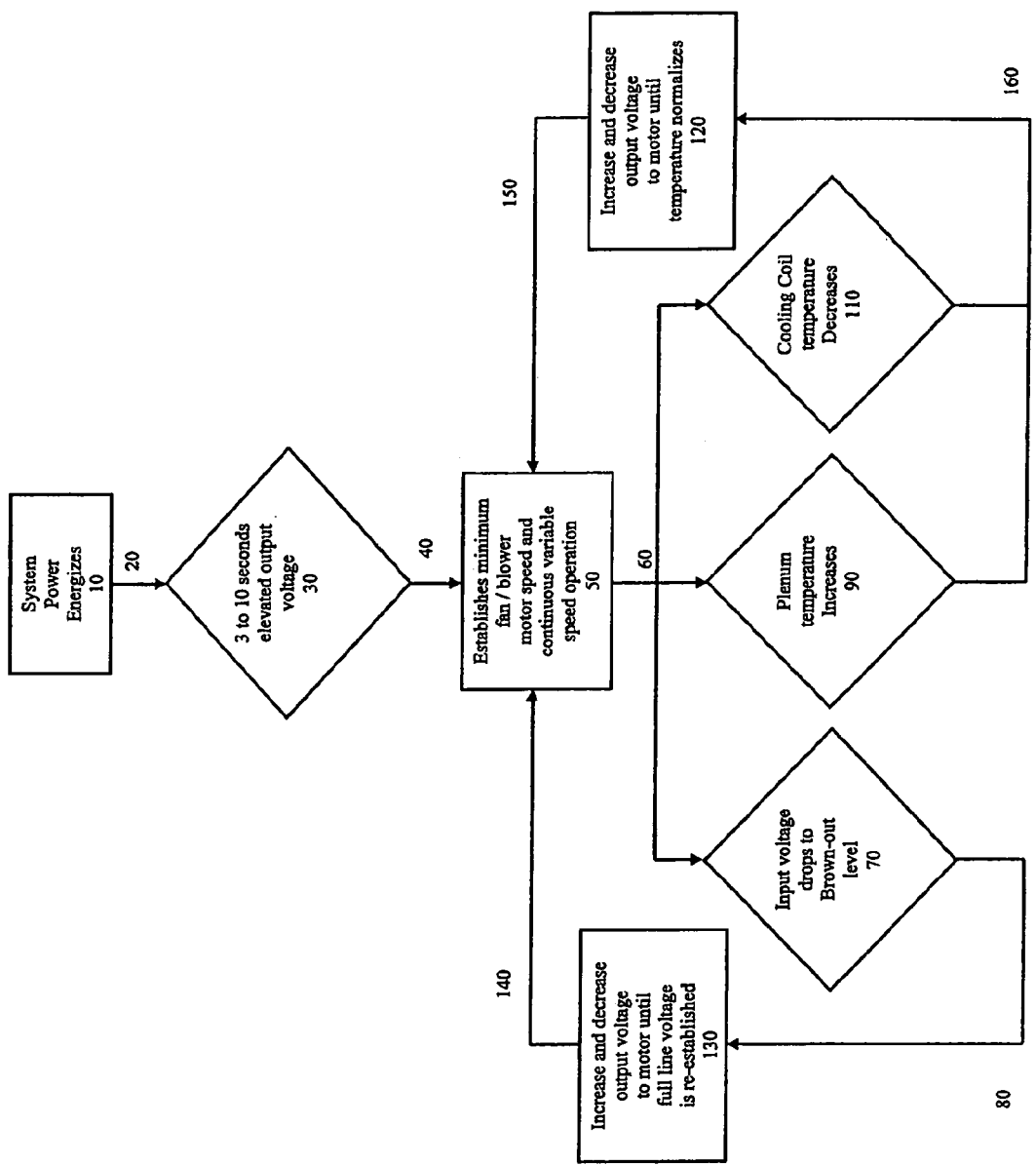
FIG. 5 is a flow chart that shows the operation of the controller of the present invention.

FIG. 5 shows the steps carried out by the controller of the present invention in response to its setting. The flow begins with a step 10 of system power energizing. 120-volt line voltage is applied to point 101 (see FIG. 1). The system power travels over a conduit 20 to immediately charge capacitor 403. In a step 30, this triggers a 3–10 second RC time-constant charge of the network comprising resistor 501 and capacitor 503. This RC time-constant charge is applied, via a conduit 40, to the comparing input of comparator 506 to provide a timed latched/de-latching trigger to LED 508, i.e., an input signal to the MPD.

In a step 50, LED 508 and resistor 310 deliver an output resistance for the gate control circuitry that initially elevates and then de-elevates the fan/blower motor speed to its maximum then minimum preset level. The fan/blower motor speed controller system remains at the minimum preset level and monitors input line voltage, plenum temperature, and cooling coil temperature via a conduit 60. If the input line voltage drops approximately 5 to 10 volts, in a step 70, the network comprising resistors 1001, 1002, 1003, 1004, 1005, 1006, 1007, and 1009, capacitor 1013, and transistors 1008 and 1010 begin to provide a control signal. The magnitude of this control signal, flowing over a conduit 80, is continuously altered in response to the deviation from full line voltage. In a step 130, this control signal is applied to the MPD, thereby delivering an output resistance for the gate control circuitry that elevates and then de-elevates the fan/blower motor speed. When 120 volts, full line voltage is re-established at point 101, a conduit 140 keeps the fan/blower motor speed controller at the minimum preset level.

If resistors 802 and 806, which are both thermistors, detect an elevated plenum temperature of 85 degrees F. or higher, a control signal is generated in a step 90. If resistors 902 and 906 (thermistors) detect a decreased cooling coil temperature of 60 degrees F. or lower, a control signal is generated in a step 110. The magnitude of this control signal, which travels over a conduit 160, is continuously adjusted to respond to the temperature when it deviates from a normalized room value. In a step 120, this control signal is applied to the MPD to deliver an output resistance for the gate control circuitry that elevates and then de-elevates the fan/blower motor speed. When the plenum/cooling coil temperature normalizes to room value, the fan/blower motor speed controller system returns via a conduit 150 to the minimum preset level.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method of controlling a blower/fan motor in a forced-air HVAC system to substantially maintain an absolute temperature in an interior space, said method comprising the steps of:
    measuring a temperature in said interior space;
    communicating the absolute temperature to a controller;
    when the absolute temperature is higher than said temperature in said interior space, causing said controller to call for heated air from said system;
    when the absolute temperature is lower than said temperature in said interior space, causing said controller to call for cooled air from said system;
    varying continuously a speed of said blower/fan motor in response to said call for said heated or said cooled air, whereby said blower/fan motor runs substantially continuously once it starts;
    said step of varying resulting in a blower/fan motor speed responsive to a temperature sensed in a plenum chamber of said system when said call is for said heated air; and
    said step of varying resulting in a blower/fan motor speed responsive to a temperature sensed in a cooling coil of said system when said call is for said cooled air.

2. The method of claim 1, wherein said system is effective to supply said heated air only.

3. The method of claim 2, wherein said temperature sensed in said plenum chamber is a controlling parameter of said system.

4. The method of claim 1, wherein said system is effective to supply said cooled air only.

5. The method of claim 4, wherein said temperature sensed in said cooling coil is a controlling parameter of said system.

6. The method of claim 1, wherein said system is effective to supply either said heated air or said cooled air.

7. The method of claim 6, wherein, when said controller calls for said heated air, said temperature sensed in said plenum chamber is a controlling parameter of said system, and, when said controller calls for said cooled air, said temperature sensed in said cooling coil is a controlling parameter of said system.

8. A controller for a blower/fan motor in a forced-air HVAC system to substantially maintain a set temperature in an interior space, said apparatus comprising:
    at least one temperature sensor for measuring a temperature in the interior space; and
    at least one temperature sensor for sensing a temperature corresponding to regulated air resulting from the HVAC system;
    wherein when the set temperature substantially differs from the sensed temperature in said interior space, said controller being effective to call for regulated air having a temperature different than air in the interior space from the HVAC system to compensate for the difference;
    said controller being effective to vary continuously a speed of said blower/fan in dependence on a temperature corresponding to at least the regulated air, whereby said blower/fan motors runs substantially continuously once it starts.

9. The controller according to claim 8, wherein the HVAC system is effective to supply heated air only.

10. The controller according to in claim 9, wherein, when said controller calls for heated air, a temperature sensed in said plenum chamber comprises the temperature corresponding to at least the regulated air.

11. The controller according to claim 8, wherein the HVAC system is effective to supply cooled air only.

12. The controller according to claim 11, wherein, when said controller calls for cooled air, a temperature sensed in a cooling coil comprises the temperature corresponding to at least the regulated air.

13. The controller according to claim 8, wherein the HVAC system is effective to supply either heated air or said cooled air.

14. The controller according to claim 13, wherein, when said temperature sensor for sensing a temperature corresponding to regulated air resulting from the HVAC system comprises a heated air plenum temperature sensor and a cooling coil temperature sensor.

15. Apparatus for controlling a blower/fan motor in a forced-air HVAC system to substantially maintain an absolute temperature in an interior space, said apparatus comprising:

a controller effective for varying continuously a speed of said blower/fan motor, whereby said blower/fan motor runs substantially continuously once it staffs;

said controller being responsive to at least one of a plenum temperature and a cooling coil temperature; and said controller being further responsive to a temperature sensor in said interior space, whereby said interior space is substantially maintained at a stable absolute temperature.

16. The controller according to claim 15, wherein said controller includes an alternistor.

17. The controller according to claim 16, wherein said alternistor is a component of a triggering circuit.

18. The controller according to claim 17, wherein said triggering circuit includes an optically-controlled mathematical processing device.

19. The controller according to claim 18, wherein said optically-controlled mathematical processing device is responsive to at least two signals.

20. The controller according to claim 19, wherein said at least two signals comprise any combination of at least one plenum temperature sensor signal, at least one cooling coil sensor signal, at least one said temperature sensor in said interior space, and at least one system fault sensor.

21. A method of controlling a blower in a forced-air climate control system to substantially maintain a desired temperature, said method comprising the steps of:

determining a desired temperature;

measuring an actual climate temperature;

measuring a temperature corresponding to temperature-controlled air from the climate control system;

at least when the actual temperature significantly differs from the desired temperature, calling for temperature-controlled air from the climate control system; and controlling a speed of a blower at least in response to a sensed temperature of the temperature-controlled air, substantially continuously during supply of temperature-controlled air from the climate control system, to maintain the actual climate temperature at the desired temperature.

* * * * *